United States Patent
Beller et al.

(10) Patent No.: US 10,565,503 B2
(45) Date of Patent: Feb. 18, 2020

(54) DYNAMIC THRESHOLD FILTERING FOR WATCHED QUESTIONS

(71) Applicant: International Business Machines Corporation, Armonk, NY (US)

(72) Inventors: Charles E. Beller, Baltimore, MD (US); Paul J. Chase, Jr., Fairfax, VA (US); Richard L. Darden, Leesburg, VA (US); Michael Drzewucki, Woodbridge, VA (US); Edward G. Katz, Washington, DC (US); Christopher Phipps, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/205,077

(22) Filed: Jul. 8, 2016

(65) Prior Publication Data
US 2018/0025274 A1    Jan. 25, 2018

(51) Int. Cl.
*G06N 5/02* (2006.01)
*G06F 16/903* (2019.01)

(52) U.S. Cl.
CPC ......... *G06N 5/02* (2013.01); *G06F 16/90335* (2019.01)

(58) Field of Classification Search
CPC ................. G06N 5/02; G06F 17/30979
See application file for complete search history.

(56) References Cited

U.S. PATENT DOCUMENTS

| 5,495,600 | A | * | 2/1996 | Terry ............... G06F 17/30551 707/754 |
|---|---|---|---|---|
| 9,141,662 | B2 | | 9/2015 | Clark et al. |
| 2004/0024775 | A1 | * | 2/2004 | Kemp ............... G06F 17/30011 |
| 2004/0260695 | A1 | * | 12/2004 | Brill .................. G06F 17/30867 |
| 2008/0147711 | A1 | * | 6/2008 | Spiegelman ........ G06F 17/3002 |
| 2011/0125734 | A1 | | 5/2011 | Duboue et al. |
| 2014/0108322 | A1 | | 4/2014 | Buchanan |
| 2014/0172878 | A1 | | 6/2014 | Clark et al. |
| 2014/0172880 | A1 | | 6/2014 | Clark et al. |
| 2015/0088998 | A1 | | 3/2015 | Isensee |
| 2015/0142418 | A1 | | 5/2015 | Byron |
| 2015/0179082 | A1 | | 6/2015 | Byron et al. |
| 2015/0324908 | A1 | | 11/2015 | Starikova |
| 2016/0048583 | A1 | | 2/2016 | Ontko |

(Continued)

OTHER PUBLICATIONS

Riva et al. Bio-Inspired In-Network Filtering for Wireless Sensor Monitoring Systems. 2013 IEEE Congress on Evolutionary Computation Jun. 20-23, Cancún, México (Year: 2013).*

(Continued)

*Primary Examiner* — Alexey Shmatov
*Assistant Examiner* — Robert Bejcek, II
(74) *Attorney, Agent, or Firm* — Pepper Hamilton LLP

(57) ABSTRACT

Embodiments are directed to a watched questions threshold filtering system that functions to determine and deliver to a user relevant and significant data changes with respect to a user's goals, as defined by a notification threshold value provided by the user. The user is provided with an option to flag one or more queries for automatic re-querying. Confidence scores are processed on new data (i.e., data ingested after the original question was asked) by utilizing a confidence threshold for indicating if the new data warrants alerting a user.

18 Claims, 5 Drawing Sheets

(56) References Cited

U.S. PATENT DOCUMENTS

| | | | |
|---|---|---|---|
| 2016/0078149 A1 | 3/2016 | Gaucher et al. | |
| 2016/0085857 A1* | 3/2016 | Clark | G06F 16/338 707/722 |
| 2016/0132567 A1* | 5/2016 | Dole | G06F 16/248 707/722 |
| 2016/0180438 A1* | 6/2016 | Boston | G06Q 30/0631 705/26.7 |
| 2017/0206271 A1 | 7/2017 | Jain | |

OTHER PUBLICATIONS

Liu et al. Differential Evaluation of Continual Queries. Proceedings of the 16th ICDCS. pp. 458-465. 1996. (Year: 1996).*

Nakayama et al. Range-based Continuous Threshold Query Processing in Mobile Ad Hoc Networks. MoMM 2015, Dec. 10-12 , 2015, Brussels, Belgium (Year: 2015).*

Liu et al.; "Differential Evaluation of Continual Queries," http://citeseerx.ist.psu.edu/viewdoc/download?doi=10.1.1.29.3480&rep=rep1&type=pdf.

Srinivasan et al.; "Method and System for Dynamically Providing Location Based Answers to Users," IP.com No. IPCOM000237370D, Jun. 16, 2014.

IBM, "A System & Method to Identify Correct Candidations for Question Answering over Structured Knowledge," IP.com No. IPCOM000180748D, Mar. 16, 2009.

Anonymous, "System and method to improve accuracy, confidence, evidence, relevant and expected answers based on . . . ," IP.com No. IPCOM00023856D, Sep. 3, 2014.

Yuan, "Watson and healthcare: How natural language processing and semantic Search could revolutionize clinical decision support," IBM developerWorks, Apr. 12, 2011.

High, "The Ere of Cognitive Systems: An Inside Look at IBM Watson and How it Works," IBM Redbooks, Dec. 12, 2012.

Non-Final Office Action dated Jul. 12, 2018 in corresponding U.S. Appl. No. 12/205,075.

* cited by examiner

DYNAMIC THRESHOLD FILTERING FOR WATCHED QUESTIONS

STATEMENT REGARDING FEDERALLY SPONSORED RESEARCH OR DEVELOPMENT

This invention was made with government support under 2013-12101100008 awarded by United States Defense Agencies. The government has certain rights to this invention.

TECHNICAL FIELD

The present invention relates generally to a cognitive system implementing a question and answer generation system, and more particularly to implementing a watched question monitoring system utilizing a dynamic threshold value.

BACKGROUND

Users of big data cognitive computing systems often desire to be notified of changes in analysis, decisions, and results as new data is received. Results pertaining to a particular query may be stored, and as more data is ingested into the system, the original query may be rerun with the new results compared to the old results. Users may then be alerted of any changes.

However, on a big data system, data updates are quite common and many may be insignificant to any particular user's goals. Users may then often be alerted to irrelevant and/or insignificant changes.

Thus, in a big data cognitive computing system, there is a need to determine which data changes are relevant to a particular user's query and significant enough to warrant notification to the user.

SUMMARY

Embodiments are directed to a computer-implemented method, a computer program product, and a system for identifying new informative responses to answer a question based on new data and user input in a system capable of answering questions.

In an embodiment, the computer-implemented method is implemented in a system capable of answering questions, the system comprising a processor and a memory comprising instructions executed by the processor.

In an embodiment, the computer program product comprises a computer readable storage medium having program instructions embodied therewith, the program instructions executable by a processor.

In an embodiment, the system comprises a processor and a memory, which comprises instructions executed by the processor.

In an embodiment, the processor executes the steps of: receiving as inputs: a watched question for monitoring; a notification threshold from a user; a first set of responses on a first date with a first confidence level resulting from the watched question; and a time stamp indicating the first date when the first set of responses were returned; querying ingested data sources after the first date for answers to the watched question to determine a second set of responses and a second confidence level; comparing the second confidence level to a dynamic threshold to determine responses from the second set of responses that meet the notification threshold; and responsive to determining the responses from the second set of responses that meet the notification threshold, providing a notification to the user.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
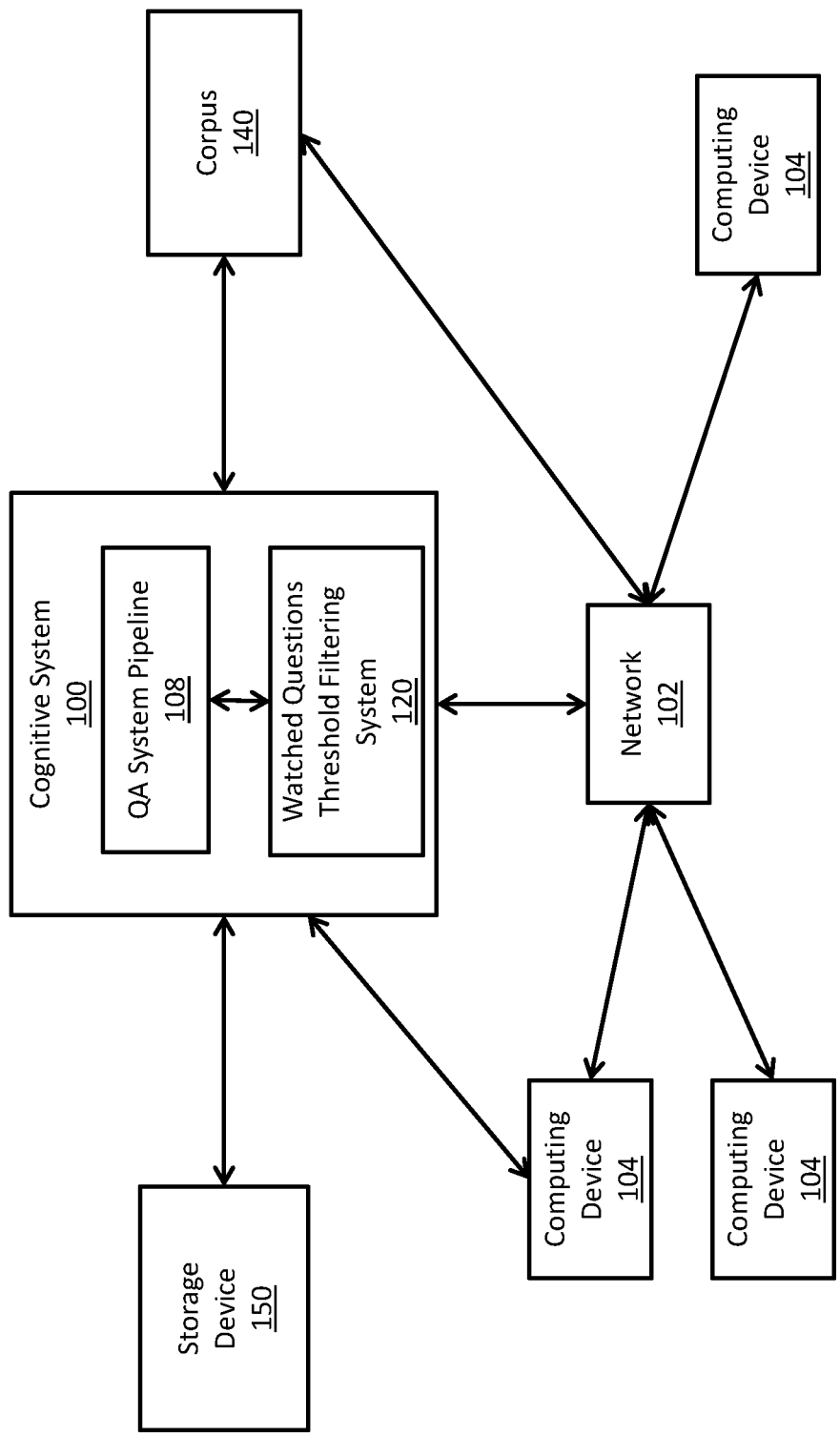
FIG. 1 depicts a schematic diagram of one illustrative embodiment of a cognitive system implementing a question and answer (QA) generation system in a computer network.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situation awareness that mimics human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question and answer (QA) pipeline 108 and, according to embodiments provided herein, a watched questions threshold filtering system 120, in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 and a watched questions threshold filtering system 120 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108, and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. The QA pipeline 108 will be described in greater detail with regard to FIG. 3.

According to an embodiment, a QA system user identifies one or more queries or questions to be watched, signifying queries/questions that are flagged for re-querying to discover new relevant answers and passages from data ingested after the original question was asked. The cognitive system 100 parses and interprets the watched question via a watched questions threshold filtering system 120, and provides a response to the cognitive system user containing one or more answers and/or one or more passages to the question that meet a respective notification threshold established by the user. In some embodiments, the cognitive system 100 provides a response to users in a ranked list of candidate answers.

In an embodiment, there may be two calculated thresholds, one for new passages calculated from the passages, and one for new answers calculated from the answers. In other embodiments, a single threshold may be calculated from either the new passages, new answers, or a pool of both answers and passages.

The cognitive system 100 implements the watched questions threshold filtering system 120, which comprises a plurality of stages for processing a watched question and the corpus of data 140. The watched questions threshold filtering system 120 generates answers and/or passages for the watched question based on the processing of the watched question, a user-provided value, and a time stamp, as well as the corpus of data 140. The watched questions threshold filtering system 120 is described in greater detail with reference to FIGS. 4 and 5.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare." IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a watched questions threshold filtering system 120. The operation of the watched questions threshold filtering system 120 may be initiated in response to additional materials being added to the corpus 140 of documents from which the cognitive system 100 interacts. Alternately, the operation of the watched questions threshold filtering system 120 may be initiated at the behest of a user, or at prescheduled intervals.

Results from the corpus 140 are stored in storage device 150 associated with either the cognitive system 100 or the watched questions threshold filtering system 120, where the storage device 150 may be a memory, a hard disk based storage device, flash memory, solid state storage device, or the like (hereafter assumed to be a "memory" with in-memory representations of the acyclic graphs for purposes of description).

Figure 2:
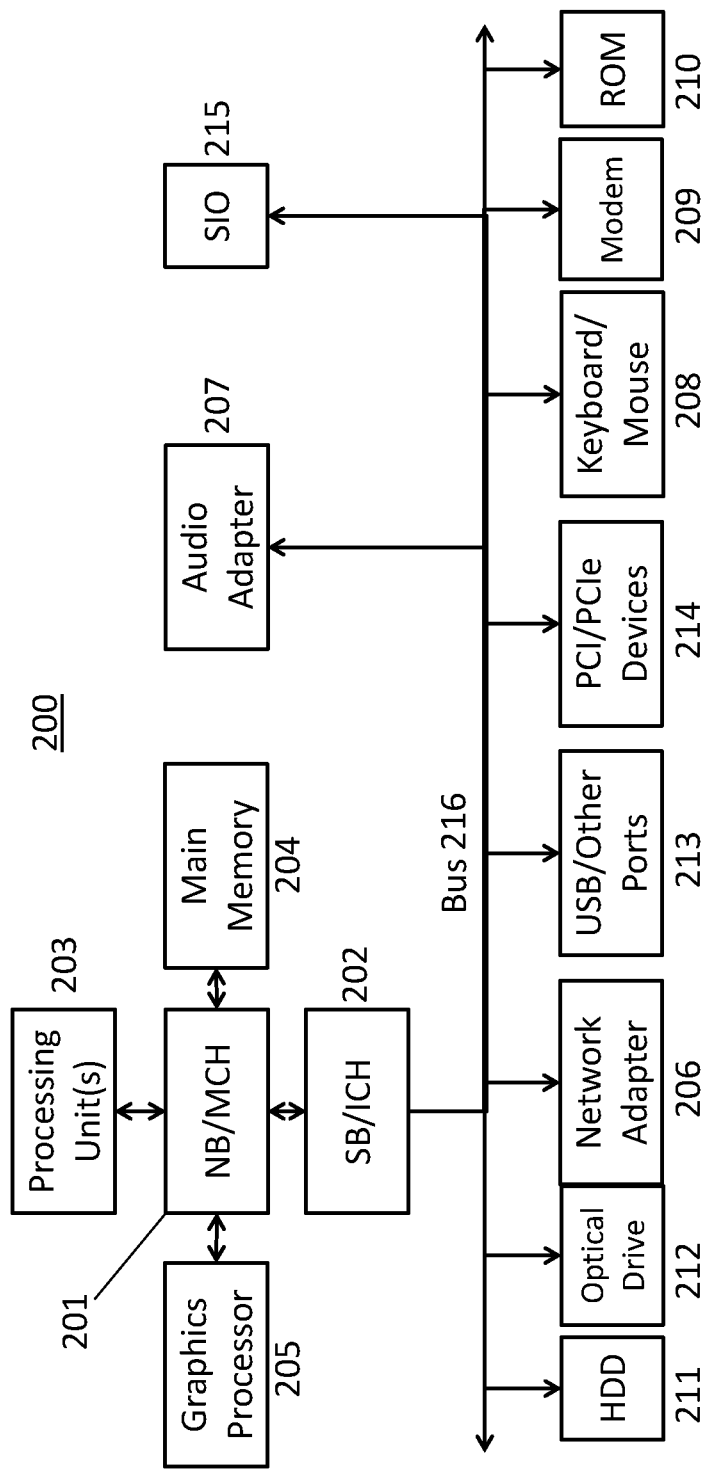
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the watched questions threshold filtering system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through, for example, an accelerated graphics port (AGP).

In the depicted example, a network adapter 206 connects to the SB/ICH 202. An audio adapter 207, keyboard and mouse adapter 208, modem 209, read only memory (ROM) 210, hard disk drive (HDD) 211, optical drive (e.g., CD or DVD) 212, universal serial bus (USB) ports and other communication ports 213, and PCI/PCIe devices 214 may connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. A super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the watched questions threshold filtering system 120, described herein, can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or the network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
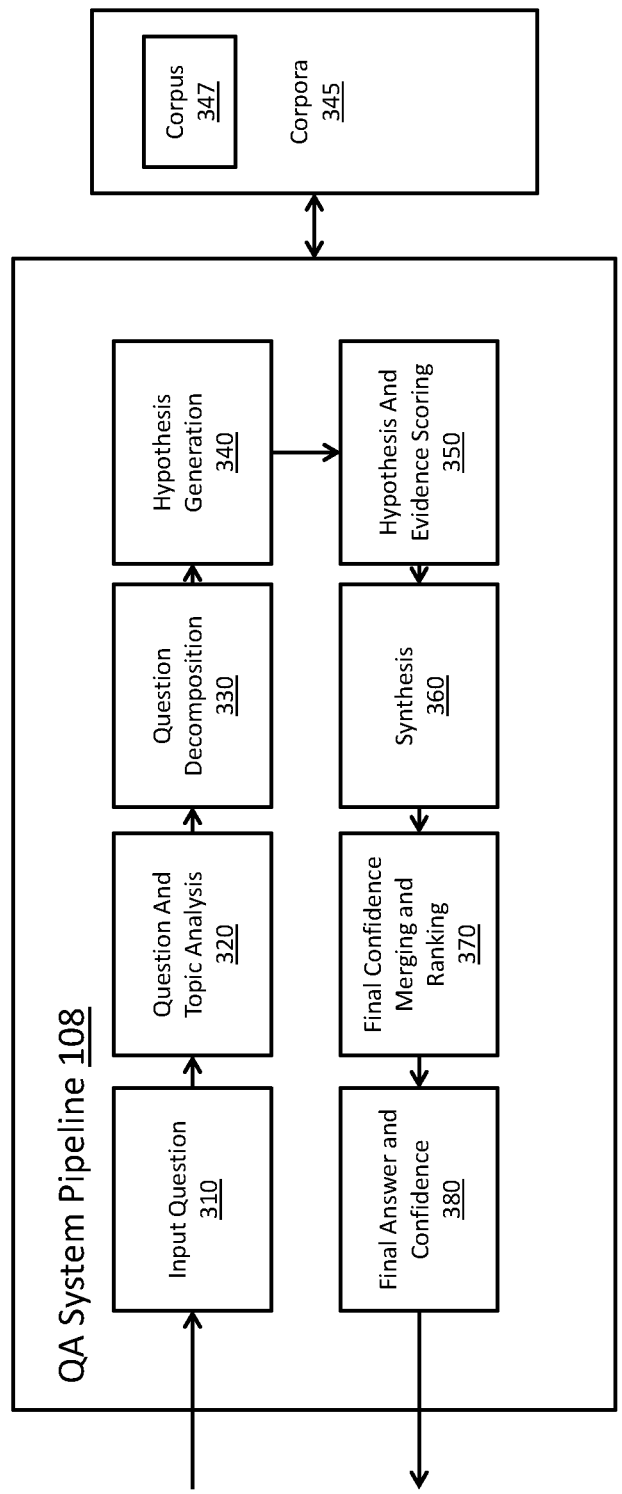
FIG. 3 illustrates a QA system pipeline, of a cognitive system, for processing an input question, according to embodiments.

FIG. 3 illustrates a QA system pipeline 108, of a cognitive system, for processing an input question. The QA system pipeline 108 of FIG. 3 may be implemented, for example, as QA pipeline 108 of cognitive system 100 in FIG. 1. It should be appreciated that the stages as shown in FIG. 3 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems. Additional stages may be provided to implement the improved mechanism, or separate logic from the pipeline 108 may be provided for interfacing with the pipeline 108 and implementing the improved functionality and operations of the illustrative embodiments provided herein.

As shown in FIG. 3, the QA pipeline 108 comprises a plurality of stages 310-380 through which the cognitive system operates to analyze an input question and generate a final response. In an initial question input stage 310, the QA pipeline 108 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 108, i.e., the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referenced to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?" the LAT is the string "maneuver." The focus of a question is the part of the question that, if replaced by the answer, makes the question a standalone statement. For example, in the question "What drug has been shown to relieve the symptoms of ADD with relatively few side effects?," the focus is "What drug" since this phrase can be replaced with the answer, e.g., "Adderall," to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 140 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 108, in stage 350, then performs a deep analysis and comparison of the language of the input question and the language of each hypothesis or "candidate answer," as well as performs evidence scoring to evaluate the likelihood that the particular hypothesis is a correct answer for the input question. As described in FIG. 1, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 108 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 108 that identifies a manner by which these scores may be combined to generate a confidence score or measure for the individual hypotheses or candidate answers. This confidence score or measure summarizes the level of confidence that the QA pipeline 108 has about the evidence that the candidate answer is inferred by the input question, i.e., that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
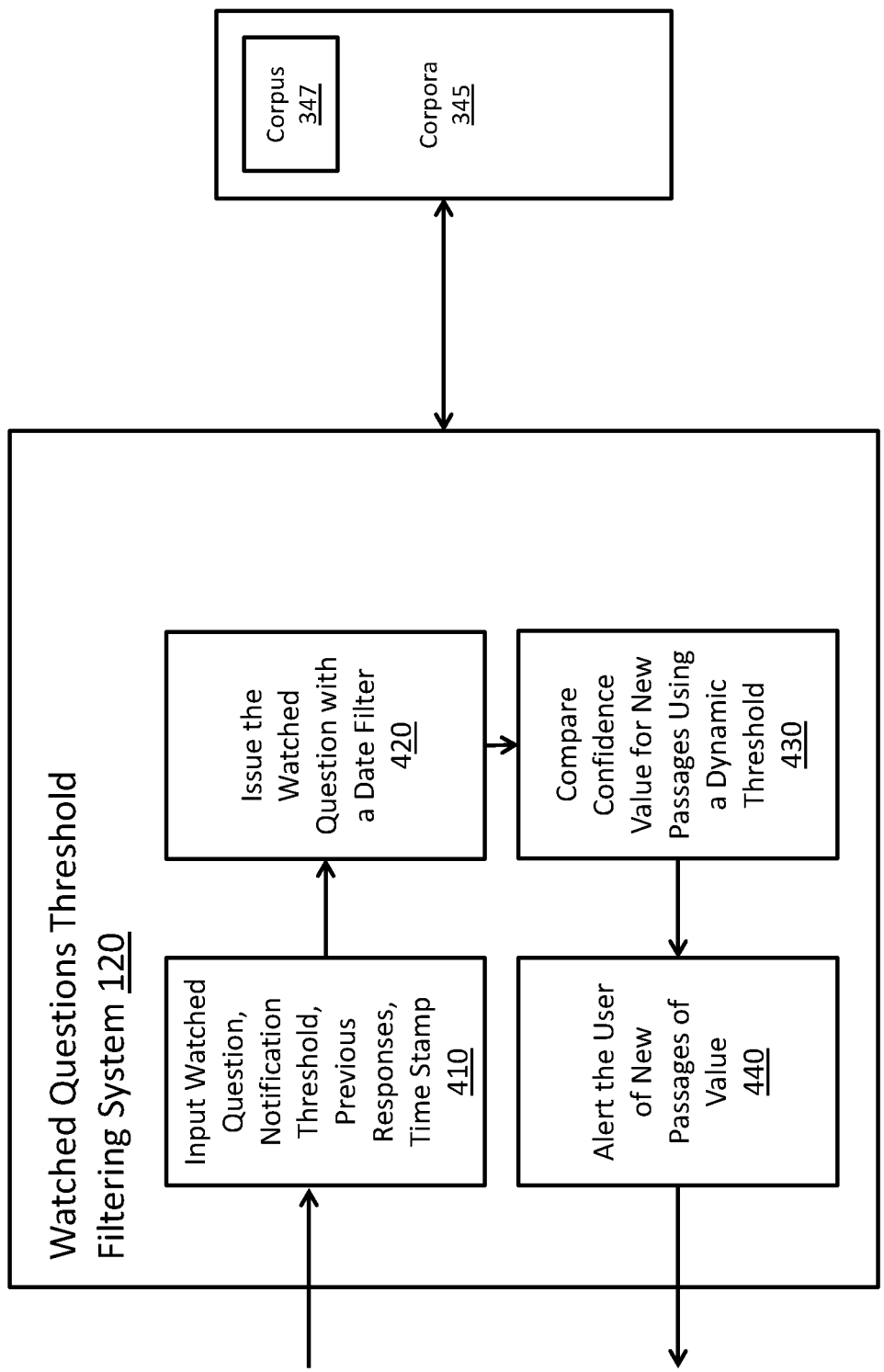
FIG. 4 illustrates a watched question threshold filtering system, of a cognitive system, for processing a watched question in accordance with embodiments described herein.

FIG. 4 illustrates a watched questions threshold filtering system 120, of a cognitive system, for processing a watched question in accordance with various embodiments. The watched questions threshold filtering system 120 of FIG. 4 may be implemented as the watched questions threshold filtering system 120 of cognitive system 100 in FIG. 1. It should be appreciated that the stages as shown in FIG. 4 are implemented as one or more software engines, components, or the like, which are configured with logic for implementing the functionality attributed to the particular stage. Each stage is implemented using one or more of such software engines, components, or the like. The software engines, components, etc., are executed on one or more processors of one or more data processing systems or devices and utilize or operate on data stored in one or more data storage devices, memories, or the like, on one or more of the data processing systems. Additional stages may be provided to implement the improved mechanism, or separate logic from the system 120 may be provided for interfacing with the system 120 and implementing the improved functionality and operations of the illustrative embodiments provided herein.

As described above, users of the QA pipeline 180 enter a query into the system to be provided with relevant passages from the existing corpus 347. Relevant passages that pass a confidence threshold are returned to the user at the time of querying. In accordance with embodiments provided herein, the watched questions threshold filtering system 120 functions to determine and deliver to a user relevant and significant data changes with respect to a user's goals, as defined by a notification threshold value provided by the user. As new data is frequently and near-constantly made available to the cognitive system 100 (i.e., added to the corpus 347), a possibility exists that information relevant to a user's original question is not provided to the user simply because of bad timing (i.e., the user submitted the question too early before the availability of relevant and significant information), thus requiring a user to manually re-run their question again to see new relevant results. By utilizing a watched questions mechanism, a user is provided with an option to flag one or more queries for automatic re-querying. However, in some cases, new relevant passages and/or answers may have a lower confidence score than older, less relevant passages and/or answers because of the volume of data being searched. In these cases, the new relevant passages and/or answers are not returned to the user. Thus, in accordance with embodiments provided herein to remedy this scenario, confidence scores are processed on new data (i.e., data ingested after the original question was asked) from watched questions by utilizing a confidence threshold for indicating if the new data warrants alerting a user.

According to embodiments provided herein, the watched questions threshold filtering system 120 takes as input a stored watched question, a notification threshold value from a user, and a time stamp indicating when the question was previously run. Previously generated responses including passages, answers, and associated confidence scores may also be included. The watched question is processed with a date filter to focus only on documents (i.e., passages and answers) that have been ingested since the user last viewed the responses. Confidence values are assigned to the new passages and/or answers and are compared to a dynamic threshold, which is based on the notification threshold value inputted by the user. Passages and/or answers with confidence values higher than the dynamic threshold are flagged as relevant and are returned to the user.

Thus, according to embodiments provided herein, the watched questions threshold filtering system 120 uses a focused source of information (passages ingested since the user last received results, i.e., new passages based on the date filter) and calculates a dynamic threshold using a user-provided value. This advantageously results in not solely relying on passages scoring higher than previous results and in having a more recent ingestion date to reveal new useful data to the user. In an embodiment, a date filter is from an ingest date to a current date, where the ingest date is the date the results of the watched question were last viewed.

Moreover, the dynamic threshold is not hard-coded into the system and changes based on the question. For example, in an embodiment, dynamic threshold is calculated as follows:

$$\text{Dynamic Threshold} = |\text{MaxConf} - (\text{ConfDelta} \cdot \text{Threshold Weight})|.$$

MaxConf denotes the maximum confidence value of the passages returned when re-running the watched question. ConfDelta is defined as the difference between the maximum confidence value and the minimum confidence value of the returned passages. The threshold weight is the notification threshold value inputted by the user. A similar threshold can be calculated for returned answers.

In an embodiment, the notification threshold value is a value between 0 and 1 and is a weighting variable (i.e., a higher notification threshold value, as set by a user, indicates the user desires results with high confidence values, while a lower notification threshold value indicates results with lower confidence values are acceptable). Advantageously, the user is able to adjust or change the inputted notification threshold value to accordingly adjust the passages and answers being received. For example, if the user is receiving too many results that are not of interest, the user can input a higher notification threshold value to fine-tune the results.

Similarly, if the user is desirous of more results, the notification threshold value can be lowered.

In an embodiment, the watched question is re-queried, and results are returned to the user, once a day. In an embodiment, the watched question is re-queried at the same frequency in which new passages are added to the information source (i.e., the corpus 347). In an embodiment, the user is able to select a frequency with which the watched question is re-queried.

According to an additional embodiment, the results of a watched question and the associated inputs may be stored and accessible for the user (e.g., to review past results).

As shown in FIG. 4, the watched questions threshold filtering system 120 comprises a plurality of stages 410-440 through which the cognitive system operates to analyze a watched question and generate a final response.

In 410, the inputs are provided and may include, as described above, a watched question, a notification threshold value from a user, and a time stamp indicating when the question was previously run. Previously generated responses included passages, answers, and associated confidence scores may also be included.

At 420, the watched question with the date filter is issued, i.e., run or processed. The date filter ensures that only new passages are included in the analysis. The analysis involves utilizing the QA pipeline 108, described above, or a like system to obtain confidence scores for relevant passages and/or answers. As described above with respect to FIG. 3 and the QA pipeline 108, confidence scores may be generated based on language comparison and evidence scoring to indicate a measure of relevance and generate a corresponding confidence score for each passage and each answer.

At 430, for each passage identified, the confidence value is compared to the dynamic threshold to determine potential relevance and significance to a user.

At 440, the user is alerted of new passages and/or answers of value, which are those passages and/or answers with a confidence value higher than the dynamic threshold as defined above. The notification may be through a notification message, user interface, and/or the like.

Figure 5:
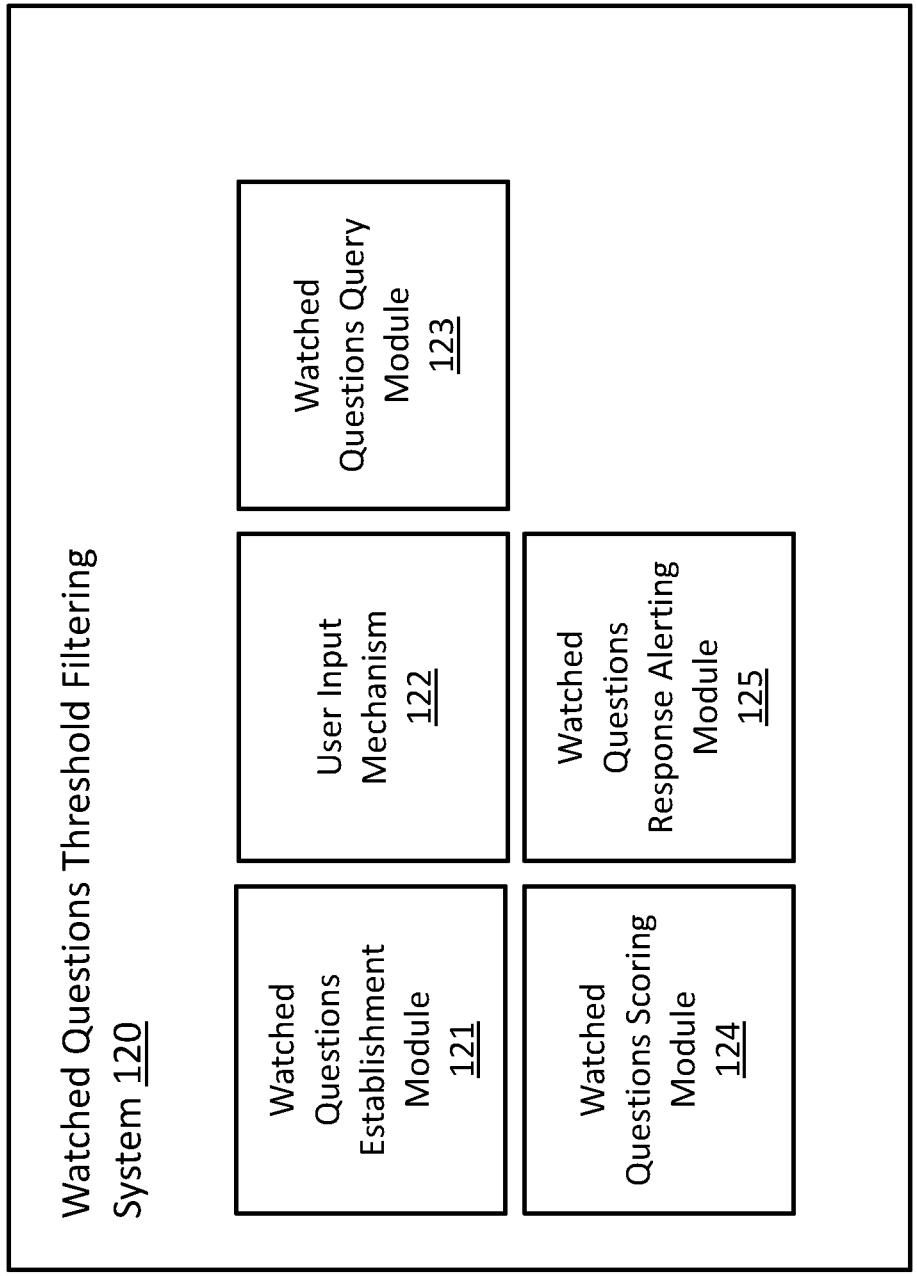
FIG. 5 illustrates a block diagram of a watched question threshold filtering system, according to embodiments described herein.

FIG. 5 illustrates a block diagram of a watched question threshold filtering system 120, according to embodiments described herein. The system 120 is comprised of various components or modules for implementing the functionality described with reference to FIG. 4. Included is a watched questions establishment module 121 that establishes a question issued of the QA pipeline 108 as a watched question while searching the full corpus 347 and storing an ingest date as the date the results of the watched question were last viewed.

According to embodiments herein, the watched question threshold filtering system 120 further comprises a user input mechanism 122 for allowing a user to enter and adjust, via a user interface, the notification threshold value.

A watched questions query module 123 implements the re-querying of the watched question as described above with respect to the QA pipeline 108.

A watched questions scoring module 124 calculates the dynamic threshold value, compares the watched question confidence value to the dynamic threshold, and stores associated metrics including, for example, the latest/most recent ingest date, the dynamic threshold, the passage and/or answer confidence values, and a count and/or record of passages and/or answers found to be valuable (i.e., those having a confidence value greater than the dynamic threshold).

A watched questions response alerting module 125 alerts the user of the results generated by the watched questions scoring module 124.

In some illustrative embodiments, the watched questions threshold filtering system 120 may be part of the IBM Watson™ Discovery Advisor or the IBM Watson™ Engagement Advisor available from International Business Machines Corporation of Armonk, N.Y., which is augmented with the mechanisms of the embodiments described hereafter.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method for identifying new informative responses to answer a question based on new data and user input in a system capable of answering questions, the system comprising a processor and a memory comprising instructions executed by the processor, the method comprising:
   receiving as inputs:
      a watched question for monitoring;
      a notification threshold from a user;
      a first set of responses on a first date with a corresponding first set of confidence levels resulting from the watched question; and
      a time stamp indicating the first date when the first set of responses were returned;
   querying ingested data sources after the first date for answers to the watched question to determine a second set of responses and a second set of confidence levels;
   calculating a dynamic threshold based on the second set of confidence levels and the notification threshold, wherein the dynamic threshold is calculated as $$\text{Dynamic Threshold} = |\text{MaxConf} - (\text{ConfDelta} \cdot \text{Threshold Weight})|$$

in which MaxConf is defined as a maximum confidence value of the second set of confidence levels, ConfDelta is defined as the difference between the maximum confidence value and a minimum confidence value of the second set of confidence levels, and the threshold weight is defined as the notification threshold value inputted by the user and comprises a weighting factor from 0 to 1;

comparing the second set of confidence levels to the dynamic threshold to determine qualifying responses from the second set of responses that meet the dynamic threshold; and responsive to determining the qualifying responses from the second set of responses that meet the dynamic threshold, providing a notification to the user.

2. The method of claim 1, wherein the second set of responses comprises a set of passages and a set of answers.

3. The method of claim 2, wherein the notification includes an indication of the at least one of one or more passages and one or more answers that meet the dynamic threshold.

4. The method of claim 2, wherein calculating the dynamic threshold comprises calculating a first dynamic threshold for the set of passages and a second dynamic threshold for the set of answers.

5. The method of claim 1, further comprising:
providing a user interface allowing the user to input the watched question and the notification threshold.

6. The method of claim 1, wherein the notification threshold is adjustable by the user of the system to adjust a quality of the responses from the second set of responses that meet the dynamic threshold.

7. The method of claim 1, wherein one or more of the responses from the second set of responses that meet the dynamic threshold have a lower associated confidence level than one or more confidence levels from the first set of confidence levels corresponding to one or more responses from the first set of responses.

8. A computer program product for identifying new informative responses to answer a question based on new data and user input in a system capable of answering questions, the computer program product comprising a computer readable storage medium having program instructions embodied therewith, the program instructions executable by a processor to cause the processor to:
receive as inputs:
a watched question for monitoring;
a notification threshold from a user;
a first set of responses on a first date with a corresponding first set of confidence levels resulting from the watched question; and
a time stamp indicating the first date when the first set of responses were returned;
query ingested data sources after the first date for answers to the watched question to determine a second set of responses and a second set of confidence levels;
calculate a dynamic threshold based on the second set of confidence levels and the notification threshold, wherein the dynamic threshold is calculated as Dynamic Threshold=|MaxConf−(ConfDelta Threshold Weight)| in which MaxConf is defined as a maximum confidence value of the second set of confidence levels, ConfDelta is defined as the difference between the maximum confidence value and a minimum confidence value of the second set of confidence levels, and the threshold weight is defined as the notification threshold value inputted by the user and comprises a weighting factor from 0 to 1;
compare the second set of confidence levels to the dynamic threshold to determine qualifying responses from the second set of responses that meet the dynamic threshold; and responsive to determining the qualifying responses from the second set of responses that meet the dynamic threshold, provide a notification to the user.

9. The computer program product of claim 8, wherein the second set of responses comprises a set of passages and a set of answers.

10. The computer program product of claim 9, wherein the notification includes an indication of the at least one of one or more passages and one or more answers that meet the dynamic threshold.

11. The computer program product of claim 8, wherein the program instructions executable by the processor further cause the processor to:
provide a user interface allowing the user to input the watched question and the notification threshold.

12. The computer program product of claim 8, wherein the notification threshold is adjustable by the user of the system to adjust a quality of the responses from the second set of responses that meet the dynamic threshold.

13. The computer program product of claim 8, wherein one or more of the responses from the second set of responses that meet the dynamic threshold have a lower associated confidence level than one or more confidence levels from the first set of confidence levels corresponding to one or more responses from the first set of responses.

14. A system for identifying new informative responses to answer a question based on new data and user input, the system comprising:
a processor configured to:
receive as inputs:
a watched question for monitoring;
a notification threshold from a user;
a first set of responses on a first date with a corresponding first set of confidence levels resulting from the watched question; and
a time stamp indicating the first date when the first set of responses were returned;
query ingested data sources after the first date for answers to the watched question to determine a second set of responses and a second set of confidence levels;
calculate a dynamic threshold based on the second set of confidence levels and the notification threshold, wherein the dynamic threshold is calculated as Dynamic Threshold=|MaxConf−(ConfDelta·Threshold Weight)| in which MaxConf is defined as a maximum confidence value of the second set of confidence levels, ConfDelta is defined as the difference between the maximum confidence value and a minimum confidence value of the second set of confidence levels, and the threshold weight is defined as the notification threshold value inputted by the user and comprises a weighting factor from 0 to 1;
compare the second set of confidence levels to the dynamic threshold to determine responses from the second set of responses that meet the dynamic threshold; and
responsive to determining the qualifying responses from the second set of responses that meet the dynamic threshold, provide a notification to the user.

15. The system of claim 14, wherein the second set of responses comprises a set of passages and a set of answers.

16. The system of claim 15, wherein the notification includes an indication of the at least one of one or more passages and one or more answers that meet the dynamic threshold.

17. The system of claim 14, wherein the processor is further configured to:
provide a user interface allowing the user to input the watched question and the notification threshold.

18. The system of claim 14, wherein the notification threshold is adjustable by the user of the system to adjust a quality of the responses from the second set of responses that meet the dynamic threshold.

* * * * *